May 25, 1965    W. R. BYRNE ETAL    3,184,840
METHODS OF MAKING VARIEGATED STOCK
Filed Aug. 1, 1962    3 Sheets-Sheet 2
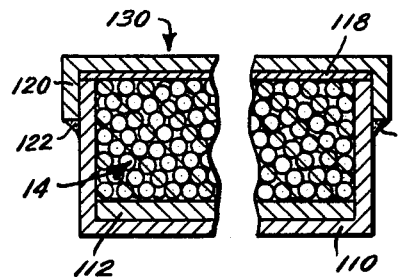
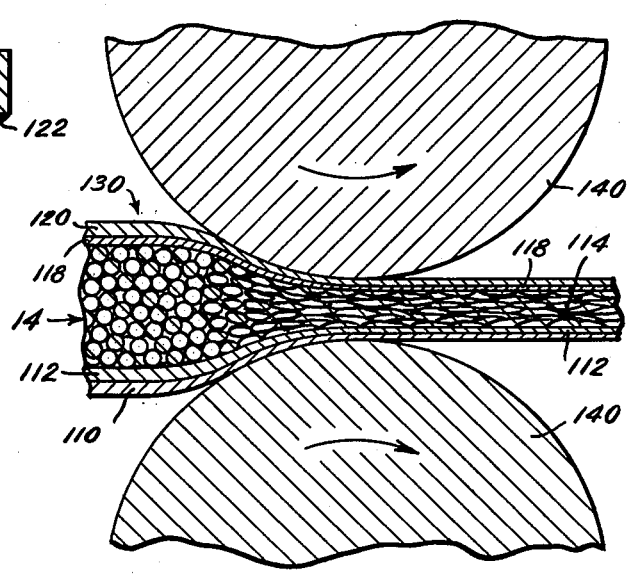
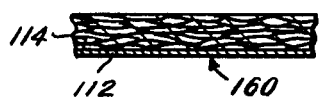
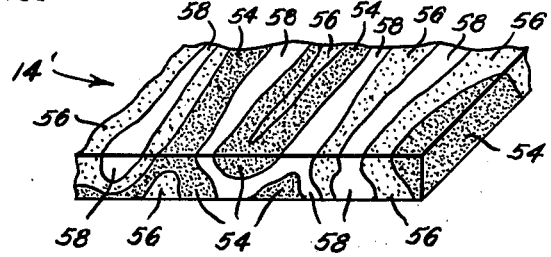
Inventors:
William Ralph Byrne,
Norman L. Brillon,
by Harold Levine Att'y.

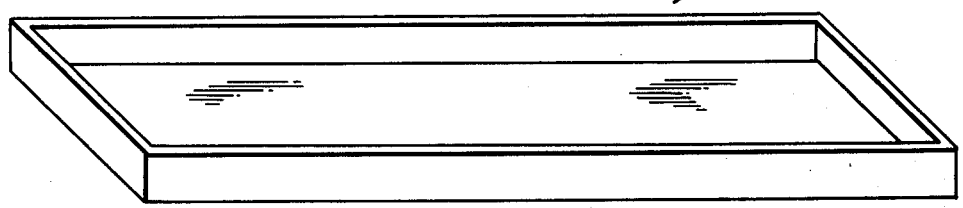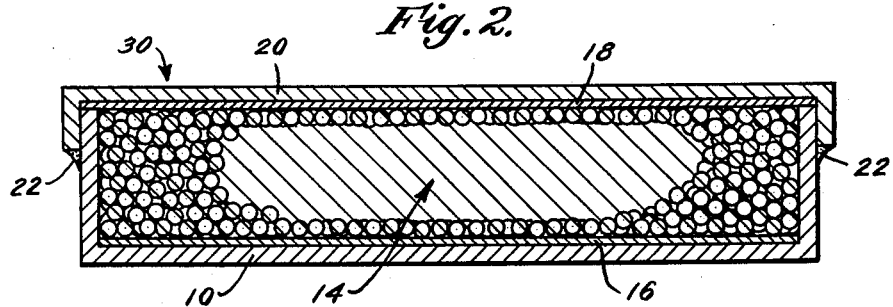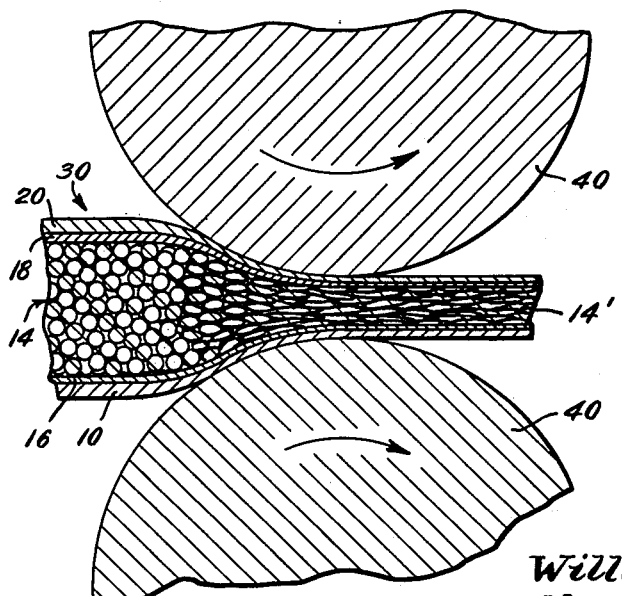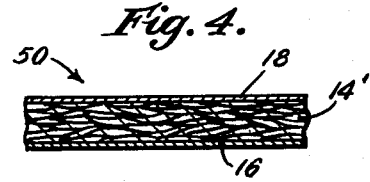

3,184,840
METHODS OF MAKING VARIEGATED STOCK
William R. Byrne, Plainville, and Norman L. Brillon, South Attleboro, Mass., assignors to Texas Instruments Incorporated, Dallas, Tex., a corporation of Delaware
Filed Aug. 1, 1962, Ser. No. 214,136
4 Claims. (Cl. 29—420.5)

This invention relates to methods of making variegated stock, and more particularly, to variegated stock, which presents a highly attractive surface appearance and is useful, for example, for ornamental purposes in forming items of jewelry or other ornamental ware.

Among the several objects of the present invention may be noted the provision of novel and improved methods of making such variegated stock which is formed of materials of different and/or constrasting colors which are interspersed throughout the stock; the provision of methods of making such stock which has a variegated surface pattern with the different colored materials forming the stock, being distinctly outlined on the surfaces of the stock in an elongated irregular shape; the provision of relatively simple and inexpensive methods for making such variegated stock; the provision of methods for making such stock which permits pattern control so that a desired pattern can be generally reproduced by mass production techniques in large quantities; and the provision of methods which permits close assay control for variegated stock formed of precious metals.

Other objects will be in part apparent and in part pointed out hereinafter.

The invention accordingly comprises the steps and sequence of steps and features of operation which will be exemplified in the methods hereinafter described, and the scope of the application of which will be indicated in the following claims.

In the accompanying drawings in which several of the various possible embodiments of the invention are illustrated:

FIG. 1 is a perspective view illustrating a container or jacket for receiving therein loose uncompacted fragments of material and other materials to be bonded in carrying out the methods of this invention;

FIG. 2 is a sectional view shownig a jacketed bonding assembly according to a first embodiment of the invention;

FIG. 3 is a diagrammatic view illustrating a squeeze bonding operation for the jacketed assembly shown in FIG. 2;

FIG. 4 is a cross sectional view showing the bonded product resulting from the roll bonding step shown in FIG. 3 and after dejacketing;

FIG. 5 is a cross sectional view illustrating the bonded variegated stock after removal of the bonding cover layers;

FIG. 6 is a fragmentary view similar to FIG. 2 showing a jacketed assembly for bonding composite stock according to a second embodiment of the invention;

FIG. 7 is a diagrammatic view similar to FIG. 3 illustrating a squeeze bonding operation for the jacketed assembly shown in FIG. 6;

FIG. 8 is a cross-sectional view similar to FIG. 4 showing the bonded product resulting from the roll bonding step shown in FIG. 7 and after dejacketing;

FIG. 9 is a cross-sectional view similar to FIG. 5 showing composite stock after removal of the bonding cover layer;

FIG. 10 is a fragmentary perspective view illustrating the resultant bonded variegated product after roll reduction to desired gauge.

Corresponding reference characters indicate corresponding parts throughout the several views of the drawings.

Figure 11:
FIG. 11 is a photographic plan view of variegated stock illustrating a typical variegated surface pattern produced according to the present invention.

Referring now to FIG. 1 of the drawings, there is shown at numeral 10 a retangular jacket or pan formed of steel or the like which receives therewithin fragments generally referred to by numeral 14 and other materials to be bonded (see FIG. 2). Fragments 14 are formed of a plurality of materials having different and contrasting colors. The term "fragments" as used herein is meant to include discrete particles of regular or irregular shape in various forms, such as, for example: shot (spherical balls), shavings, filings, burrings, scalpings, skivings, chopped-up particles, and short segments of wire or mixtures of these various forms. The materials may, for example, be precious metals such as gold and silver or base metals such as brass, nickel, copper and combinations of precious and base metals. The term metals as used herein includes alloys.

After the fragments of different colored materials have been collected, they are cleaned to remove bond-deterrent films and surface contaminants. Fragments 14 may, for example, be cleaned by an acid pickling step followed by an alcohol rinse. Another suitable cleaning method is by heating in a reducing atmosphere to remove oxides and drive off volatile contaminants and barriers to bonding.

The clean metal fragments 14 of the different colored materials are then randomly and mutually intermixed and commingled by stirring or by suitable mixing and agitation. The interspersed and mixed fragments 14 of the various colored materials are then infilled into the jacket 10 on a thin metal sheet 16 (e.g., formed of nickel) which is disposed at the bottom of jacket 10 as best seen in FIG. 2, for example, to a depth of 1¼ inches. The loose uncompacted fragments are filled to the top of the jacket 10, as best seen in FIG. 2, which is then covered with a thin metal sheet 18, similar to sheet 16. The jacketed assembly is then completed by a cover member 20 which is welded to jacket 10 about its periphery as at 22 to seal the jacket. Cover member 20 is formed of steel plate or the like and may, for example, be ¼ of an inch thick. The jacket 10, fragments 14, sheets 16 and 18, and cover member 20 form a bonding package generally referred to by numeral 30. The surface of sheet 16 which abuts jacket 10 and that of sheet 18 which abuts cover 20 are not cleaned and are coated with a suitable stop off or bond-deterrent material, e.g., milk of magnesia, zirconia, alumina or graphite in a suitable suspension to prevent bonding between sheet 16 and jacket 10 and between sheet 18 and cover 20. Sheet members 16 and 18 serve as bonding cover members to prevent bonding between the fragments 14 and the jacket 10 and cover member 20. We have found that the stop off coatings on jacket 10 and cover member 20 will in many cases penetrate between the loose uncompacted fragments and prevent bonding between the fragments if bonding cover sheets 16 and 18 are omitted.

The jacketed assembly generally referred to by numeral 30, as shown in FIG. 2, is then heated prior to rolling, for example, in a furnace. A suitable example is heating to a temperature of 1500° F. for about one hour.

Assembly 30 is then subjected, while hot, to a roll squeezing step between a pair of rolls 40, as shown in FIG. 3. Rolls 40 are preferably hot, an example of a suitable temperature being 175° to 400° F. Assembly or package 30 is hot rolled with a sufficient reduction to produce a suitable squeezing pressure to solid-phase bond and compact the fragments 14 together into solid, dense stock. Reduction rolling to effect bonding may be carried out in a single pass or in a plurality of rolling passes. By solid-phase bonding is meant bonding which is effected substantially without the presence or production in an appreciable amount of a liquid phase or of brittle intermetallic compounds and also without alloying in an appreciable amount. By liquid phase or alloying in an appreciable amount is meant such amounts as would prevent the different colored material constituents of the stock from remaining distinct in the bonded product. The temperature of package 30, rolls 40 and amount of roll reduction are such as to compact and densify fragments 14 and to effect solid-phase bonding between the fragments. The temperature of bonding preferably lies within the range which extends from approximately the recrystallization temperature of the material having the lowest recrystallization temperature to one of those temperatures, whichever is the lower, as the case may be, at which liquid phase material or a brittle intermetallic compound would form in an appreciable amount. The values of the temperature and roll reduction required for solid-phase bonding will vary, of course, depending on the particular materials employed. For example, where the fragments 14 are formed of a 70–30 brass, commercially pure copper, and an 18% nickel-silver alloy as the contrasting colored materials, a suitable package 30 temperature is 1550° F. and a suitable roll reduction (in a plurality of passes) to effect solid-phase bonding of the fragments was found to be about 90% of the over-all thickness of the package 30. The package 30 was heated to a temperature of 1550° F. in a furnace prior to rolling for about 60 minutes or so for this example.

The approximate percentage weight compositions of the 18% nickel-silver alloy and 70–30 brass alloy are:

18% nickel-silver:
  70.5–73.5% copper
  17.0–19.5% nickel
  0.05% (max.) lead
  0.25% (max.) iron
  0.5% manganese
  Balance zinc.

70–30 brass alloy:
  68.5–71.5% copper
  0.07% (max.) lead
  0.05% (max.) iron
  0.15% (max.) other elements
  Balance zinc.

Other examples of suitable temperatures, and roll reductions to effect bonding are set forth in examples below for various combinations of materials.

After the heating and roll squezing or roll bonding operation, the jacket or package is removed from around the bonded ingot or stock. The resultant dejacketed bonded stock is shown in cross-section in FIG. 4 and indicated generally by numeral 50. Removal of the jacket or package may be accomplished for example, by peeling or machining. There is no bonding between the jacket 10 and bonding cover sheet 16 or between cover 20 and cover bonding sheet 18, as the interfaces between these members had not been cleaned and had been provided with a coating of suitable parting compound to prevent bonding.

Stock 50 as best seen in FIG. 4 is a three-layered material consisting of a thin cover sheet 18 (e.g., about 0.001″ thick), solid-phase bonded to a dense, solid-phase bonded layer 14′ (formed of fragments 14), which in turn is solid-phase bonded to a thin cover bonding sheet layer 16 (e.g., about 0.001″ thick).

Next the cover sheets 18 and 16 are removed from the variegated solid-phase bonded stock 14′, for example, by skiving, abrading or chemical milling or in any other convenient way. After removal of sheets 16 and 18, the resultant product is variegated stock 14′ which is shown in cross section in FIG. 5. Variegated stock 14′ is then subjected to a roll squeezing operation to reduce the thickness of the stock to desired gauge. Rolling the bonded stock 14′ to finish gauge is preferably accomplished with a plurality of alternate rolling passes and intermediate annealing steps. Examples of suitable annealing steps for particular materials are set forth below.

In FIG. 10 is shown a fragmentary perspective view of an example of a stock 14′ (after being roll reduced to final desired gauge) which is formed throughout its thickness entirely of fragments of three materials 54, 56 and 58, of different and contrasting colors. The different colored materials 54, 56 and 58 are distinctly outlined on the exposed surfaces of the stock 14′ in an elongated irregular shape. The multicolored or differently colored fragments of materials 54, 56 and 58, which have been mutually interspersed or commingled and bonded together, provides stock 14′ which is variegated not only on its exposed surfaces but also throughout its entire thickness. This has the advantage of avoiding the drawbacks of destruction or obliteration of part or all of the variegated ornamental surface pattern due to surface wear and abrasion in normal use. In contrast, materials which depend for their ornamental surface on surface coatings are normally subject to these drawbacks.

In FIG. 11 is shown a photographic plan view of an actual example of stock made according to the invention in which three different colored materials were used for the fragments which were bonded together to form the stock. It can be seen from FIG. 11 that each of the different colored materials or constituents forming the stock remains distinct and is outlined in an irregular shape presenting an aesthetically pleasing ornamental variegated surface appearance. The variegated surface pattern of stock 14′ may be varied by further reduction rolling and elongation of the pattern. The size of the fragments 14 (before compaction and bonding) also effect the size and over-all appearance of the variegated surface pattern in the finished stock 14′. For fine (closely spaced) patterns, as opposed to coarse variegated surface patterns, suitably sized fragments 14 are those which will pass through a number 5 mesh size screen (i.e., 25 openings to the square inch). For coarser variegated surface patterns in the finished product, larger size fragments 14 should be used, e.g., a number −2 mesh size (i.e., fragments which will pass through a screen having 4 openings to the square inch). Mesh sizes for fragments 14 will generally range from −2 to −10. The embodiment of FIGS. 1–5 of the present invention is particularly useful for providing variegated stock of precious metal, since very close assay control is permitted and minimum waste is encountered in carrying out the methods of this invention. Further, the stock of this invention being variegated throughout its cross section or thickness can conveniently also be used in wire, rod or tube form as well as in sheet or strip form.

In some cases, it may be desirable to partially compact cleaned fragments 14 by cold compaction, e.g., in a die (not shown), prior to assembling the fragments in jacket 10.

The methods of this invention can combine fragments not only of different colored materials, but also of materials which may vary in hardness and malleability. Variegated metal stock 14′ (after being bonded into stock form) can be bonded to a suitable backing layer (e.g., nickel) for example, to form gold filled or rolled gold plate (e.g., where stock 14′ is formed of different colored gold materials) or other composite stock. The bonding may be accomplished by any of many known methods, suitable examples being solder bonding or solid-phase bonding by the Boessenkool et al. process as shown and described in U.S. Patent No. 2,691,815. Composite stock can also be made according to a second embodiment of this invention at the time fragments 14 are solid-phase bonded together to form the variegated stock 14′.

Referring now to FIG. 6 there is shown a fragmentary view of a package generally referred to by numeral 130 which is similar to package 30 shown in FIG. 2. Package or jacketed assembly 130 comprises a rectangular metal (e.g., steel) jacket or pan 110, a metal (e.g., steel) cover member 120 which is peripherally welded as at 122 to the jacket 110. Disposed at the bottom of jacket 110 is a metal (e.g., nickel) base layer 112 which is to form part of the solid-phase bonded stock. Layer 112 is cleaned at one surface as by abrading to remove bond-deterrent films and gross surface contaminants which might act as barriers to bonding. The other surface of layer 112 is not cleaned and is coated with a suitable stop off or parting compound of a suitable bond-deterrent material (e.g., milk of magnesia, zirconia, alumina or graphite in a suitable suspension) to prevent bonding. Layer 112 is assembled within jacket 110 with the bond-deterrent coated side thereof in interfacial abutting relation to the bottom of the jacket. Cleaned mixed fragments 14 of various colored materials, for example, in the form of shot, are then infilled into the jacket on the abraded side of the layer 112. The mixed fragments 14 fill the entire jacket as shown in FIG. 6. A thin bonding cover sheet 118 (similar to sheet 18 in FIG. 2) covers the jacket 110, and the assembly is completed by peripherally welding cover 120 about the jacket 110 as at 122.

The jacketed assembly 130 is then heated in the manner described above for the assembly 130 and is subjected while hot to a roll reduction step between a pair of heated rolls 140 as shown in FIG. 7. The assembly 130 is hot rolled with a sufficient reduction to compact and solid-phase bond fragments 14 into a solid, dense variegated layer (indicated at 114 in FIGS. 7–9) and also to solid-phase bond the fragments 14 to the base layer 112. During the bonding process, cover sheet 118 also becomes solid-phase bonded to the variegated stock layer 114 as in the case of stock 14′ in the embodiment of FIGS. 1–5. After the roll bonding step the jacket or package is removed from around the bonded composite stock. The resultant dejacketed composite stock is shown in cross section in FIG. 8 and indicated generally by numeral 150. Next, bonding cover layer 118 is removed from the stock as by skiving, machining, chemical milling, or abrading, leaving a two-layered composite stock generally indicated at numeral 160, which as shown in cross section in FIG. 9, comprises a layer of variegated metal 114, solid-phase bonded to base layer 112. The exposed surface of variegated layer 114 has a variegated surface pattern similar to that of material 14′ described above, and shown in the photographic plan view of FIG. 11 wherein each of the different colored materials or constituents forming the variegated layer 114, remains distinct and is outlined in an elongated irregular shape on the surface. Stock 160 is then further roll reduced to desired final gauge. Subsequent reduction rolling may include intermediate annealing steps. Examples of suitable annealing steps will be set forth in the examples below for various combinations of material.

The following examples illustrate the present invention:

*Example I*

In this example, the fragments were used in the form of shot made of base metals having different and contrasting colors. A trade designated "18% nickel-silver" alloy, commercially pure copper, and a 70–30 brass were used as the contrasting materials.

The shot was prepared by separately melting a quantity of each of these materials and pouring the molten metal into a container through a stream of water to form the shot. The shot from each of these materials was kept separate and screened through a number 6 mesh screen (i.e., 36 openings to the square inch). The shot which passed through the screen was retained and then cleaned by heating to a temperature of 1400° F. for about one hour in a reducing atmosphere of cracked ammonia. Thereafter, the cleaned shot of each of the three different colored and contrasting materials was mixed and interspersed in a large beaker by stirring. A jacket 1¼ inches in inside depth was then prepared using AISI No. 1008 steel plates ¼ inch thick. All of the inside surfaces of the jacket were painted with milk of magnesia as a bond-deterrent coating. The coating was permitted to dry prior to assembling the fragments therein. A 0.010 inch thick nickel sheet was placed on the bottom of the jacket. The side of the nickel sheet facing the jacket was also painted with milk of magnesia to prevent bonding between the sheet and the jacket. The mixed multicolored shot was then poured into the jacket on the nickel sheet and filled to the top of the jacket. A second nickel sheet 0.010 inch thick covered the open end of the jacket. A cover member formed of a ¼ inch thick steel plate was placed on top of the second nickel sheet and welded to the jacket. The interface of the second nickel sheet and cover member were each painted with milk of magnesia to prevent bonding therebetween. The jacketed assembly had an outside overall thickness of about 1¾ inches. The jacketed assembly was then heated to a temperature of about 1550° F. for about one hour. The package while hot was then rolled between a pair of hot rolls with a plurality of rolling passes. The first two rolling passes reduced the overall thickness of the jacketed assembly by about 0.20 inch per pass to an outside over-all thickness of approximately 1.350 inches. The assembly was then further subject to a plurality of rolling passes until the assembly was reduced in outside over-all thickness to about 0.200 inch. The cumulative roll reductions in the over-all thickness of the jacketed assembly was approximately 88.6%. The edges of the jacket were then trimmed and the sides of the jacket were removed to dejacket the bonded composite. Both of the nickel sheets, which were solid-phase bonded to the solid variegated stock, were removed by abrading. The resulting layer of variegated stock was dipped in a borax solution and was annealed at a temperature of 1000° F. for about one hour. The stock was then washed, pickled and scrubbed and roll reduced to a final thickness of 0.050 inch with a plurality of alternate rolling and annealing steps. The annealing steps were performed at a temperature of 1000° F. for periods of about one hour, with the stock being dipped in a borax solution prior to annealing.

*Example II*

In this example nickel-silver, 70–30 brass and commercially pure copper fragments which passed through a number 6 mesh screen like those of Example I, were used. This example differs from Example I only in that a base metal layer having a starting thickness of 0.750 inch was assembled with the fragments in the jacket in place of the first nickel layer in Example I which was placed on the bottom of the jacket. The base metal layer was a P20 alloy having the approximate percentage weight composition of copper, 86–89%; tin, 1.75–2.25%; lead, 0.015% (max.); iron, 0.05% (max.), and the balance zinc.

The base metal layer was cleaned as by abrading to remove bond-deterrent films and other surface contaminants which might act as barriers to bonding on the side thereof which abutted the fragments. The side of the base metal layer which abutted the bottom of the jacket was painted with milk of magnesia to prevent bonding between the layer and the jacket. The jacket was closed by a 0.010 inch thick nickel sheet and by a steel plate cover as described in Example I. The jacketed assembly had an over-all starting thickness of about 1½ inches and was heated to 1550° F. for about one hour. The assembly was the nsubjected to a hot rolling step between rolls which were heated to about 200° F. The assembly underwent a cumulative reduction of about 90% in a plurality of passes which was sufficient to solid-phase bond the fragments into a solid, dense layer and also to solid-phase bond the fragments to the base metal layer and to the thin nickel cover bonding layer. The bonded composite was then dejacketed and the thin cover bonding nickel layer was removed by abrading. The resulting composite was then dipped in a borax solution and annealed at a temperature of about 1000° F. for about one hour. The composite was then washed, pickled and scrubbed and was then further reduced to finish gauge with a plurality of alternate reducing and annealing steps. The annealing steps were each performed at a temperature of 1000° F. for an average time of about 45 minutes per anneal. The composite was dipped in a borax solution before each annealing step.

*Example III*

This example is substantially identical to Example I except that sifted fragments in the form of burrings were used. The fragments in this example had a mesh size of −10.

*Example IV*

In this example nickel-silver, commercially pure copper and 70–30 brass sifted number −6 mesh fragments in the form of shot were used. This example is similar to Example II in that a P20 alloy base metal layer having a starting thickness of 0.750 inch was assembled on the bottom of the jacket. Thereafter the jacket was infilled with the fragments.

The base metal layer was cleaned as by abrading to remove bond-deterrent films and other surface contaminants which might act as barriers to bonding on the side thereof which abutted the fragments. The side of the base metal layer which abutted the bottom of the jacket was painted with milk of magnesia to prevent bonding between the layer and the jacket. The jacket was closed by a 0.010 inch thick nickel sheet and by a steel plate cover as described in Example I. The jacketed assembly had an over-all starting thickness of about 1½ inches and was heated to about 1625° F. for about one hour. The assembly was then subjected to a hot rolling step between rolls which were heated to about 200° F. The assembly underwent a cumulative reduction of about 82% in a plurality of passes which were sufficient to solid-phase bond the fragments into a solid, dense layer and also to solid-phase bond the fragments to the base metal layer and to the thin nickel cover bonding layer. The bonded composite was then dejacketed and the thin cover bonding nickel layer was removed by abrading. The resulting composite was then annealed at a temperature of about 1100° F. in a reducing atmosphere for about 30 minutes. The composite was then pickled and scrubbed and further reduced to .080 inch. The stock was then further rolled to a finish gauge of about 0.018 inch with a plurality of alternate roll reducing and intermediate annealing steps. All but the last two intermediate annealing steps were performed at a temperature of about 1100° F. in a reducing atmosphere for an average time of about 25 minutes. The last two annealing steps were precoated with a borax solution and were heated in air to a temperature of about 1050° F. for an average time of about 20 minutes.

In view of the above, it will be seen that the several objects of the invention are achieved and other advantageous results are obtained.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. The method of making variegated metal stock comprising the steps of providing clean metallic fragments formed of a plurality of metallic materials having different and contrasting colors; mixing and interspersing said fragments; providing a metal layer and applying a bond-deterrent coating to one surface thereof; disposing said layer in a jacket with said bond-deterrent coated surface abutting the bottom of said jacket; disposing said mixed fragments on said metal layer in said jacket; providing a second metal layer, applying a bond-deterrent coating to one surface of said layer and assembling said second layer in said jacket with the uncoated surface thereof against said fragments; applying a cover to said jacket externally of and against the bond-deterrent coated surface of said second layer; heating said jacket and contents to a temperature which lies within the range which extends from approximately the recrystallization temperature of the material having the lowest recrystallization temperature to the lowest of those temperatures at which liquid phase material or a brittle intermetallic compound would form in an appreciable amount; rolling said jacketed assembly while hot to compact and solid-phase bond said fragments into solid, dense stock and to solid-phase bond said fragments to said first and second metal layers without the production of a liquid phase material; dejacketing the stock as bonded; and removing one of said metal layers from the stock by abrading after dejacketing to leave a composite material comprising a layer of variegated metal solid-phase bonded to a second layer of metal; said variegated layer having a variegated surface pattern with the different colored materials each being distinctly outlined on the surface in an elongated irregular shape.

2. The method of making variegated metal stock comprising the steps of providing clean metallic fragments formed of a plurality of metallic materials having different and contrasting colors; mixing and interspersing said fragments; providing a metal layer and applying a bond-deterrent coating to one surface thereof; disposing said layer in a jacket with said bond-deterrent coated surface abutting the bottom of said jacket; disposing said mixed fragments on said metal layer in said jacket; providing a second metal layer, applying a bond-deterrent coating to one surface of said layer and assembling said second layer in said jacket with the uncoated surface thereof against said fragments; applying a cover to said jacket externally of and against the bond-deterrent coated surface of said second layer; heating said jacket and contents to a temperature which lies within the range which extends from approximately the recrystallization temperature of the material having the lowest recrystallization temperature to the lowest of those temperatures at which liquid phase material or a brittle intermetallic compound would form in an appreciable amount; rolling said jacketed assembly while hot to compact and solid-phase bond said fragments into solid, dense stock and to solid-phase bond said fragments to said first and second metal layers without the production of a liquid phase material; dejacketing the stock as bonded; and the removing by chemical means one of said metal layers from the stock after dejacketing to leave a composite material comprising a layer of variegated metal solid-phase bonded to a second layer of metal; said variegated layer having a variegated surface pattern with the different colored materials each being distinctly outlined on the surface in an elongated irregular shape.

3. The method of making variegated metal stock comprising the steps of providing clean metallic fragments formed of a plurality of metallic materials having different and contrasting colors; mixing and interspersing said fragments; providing a relatively thin metal layer and applying a bond-deterrent coating to one surface thereof; disposing said layer in a jacket with said bond-deterrent coated surface abutting the bottom of said jacket; disposing said mixed fragments on said metal layer in said jacket; providing a second relatively thin metal layer, applying a bond-deterrent coating to one surface of said layer and assembling said second layer in said jacket with the uncoated surface thereof against said fragments; applying a cover to said jacket externally of and against the bond-deterrent coated surface of said second layer; heating said jacket and contents to a temperature which lies within the range which extends from approximately the recrystallization temperature of the material having the lowest recrystallization temperature to the lowest of those temperatures at which liquid phase material or a brittle intermetallic compound would form in an appreciable amount; rolling said jacketed assembly while hot to compact and solid-phase bond said fragments into solid, dense stock and to solid-phase bond said fragments to said first and second metal layers without the production of a liquid phase material dejacketing the stock as bonded, and removing said layers from the stock after dejacketing by abrading to leave a variegated surface pattern with said different colored materials each being distinctly outlined on said surface in an elongated irregular shape.

4. The method of making variegated metal stock comprising the steps of providing clean metallic fragments formed of a plurality of metallic materials having different and contrasting colors; mixing and interspersing said fragments; providing a relatively thin metal layer and applying a bond-deterrent coating to one surface thereof; disposing said layer in a jacket with said bond-deterrent coated surface abutting the bottom of said jacket; disposing said mixed fragments on said metal layer in said jacket; providing a second relatively thin metal layer, applying a bond-deterrent coating to one surface of said layer and assembling said second layer in said jacket with the uncoated surface thereof against said fragments; applying a cover to said jacket externally of and against the bond-deterrent coated surface of said second layer; heating said jacket and contents to a temperature which lies within the range which extends from approximately the recrystallization temperature of the material having the lowest recrystallization temperature to the lowest of those temperatures at which liquid phase material or a brittle intermetallic compound would form in an appreciable amount; rolling said jacketed assembly while hot to compact and solid-phase bond said fragments into solid, dense stock and to solid-phase bond said fragments to said first and second metal layers without the production of a liquid phase material dejacketing the stock as bonded, and removing said layers by chemical means from the stock after dejacketing to leave a variegated surface pattern on each of two surfaces with said different colored materials each being distinctly outlined on said surfaces in an elongated irregular shape.

References Cited by the Examiner

UNITED STATES PATENTS

| | | |
|---|---|---|
| 450,412 | 4/91 | Knight. |
| 2,370,400 | 2/45 | Graves _____ 29—191.2 XR |
| 2,626,458 | 1/53 | Lieberman. |
| 3,059,331 | 10/62 | Pfluum _____ 29—420.5 XR |

FOREIGN PATENTS 888,119   1/62   Great Britain.

WHITMORE A. WILTZ, *Primary Examiner.*